United States Patent [19]
Enright

[11] Patent Number: 4,917,728
[45] Date of Patent: Apr. 17, 1990

[54] ALUMINIUM ALLOY TREATMENT

[75] Inventor: Philip G. Enright, Hook Norton, England

[73] Assignee: Alcan International Limited, Quebec, Canada

[21] Appl. No.: 188,520

[22] Filed: Apr. 29, 1988

[30] Foreign Application Priority Data

Apr. 29, 1987 [GB] United Kingdom ................ 8710200

[51] Int. Cl.⁴ .............................................. C22B 9/10
[52] U.S. Cl. .................................... 75/68 R; 420/528; 420/552
[58] Field of Search ............... 75/68 R; 420/528, 552, 420/590

[56] References Cited

U.S. PATENT DOCUMENTS

| | | | |
|---|---|---|---|
| 2,362,147 | 11/1944 | Mondolfo | 75/68 R |
| 2,464,610 | 3/1949 | Regner | 420/548 |
| 3,198,625 | 8/1965 | Stroup | 75/68 R |
| 3,900,313 | 8/1975 | Martin | 75/68 R |

FOREIGN PATENT DOCUMENTS 50442  4/1980  Japan .................................. 75/68 R

*Primary Examiner*—Robert McDowell
*Attorney, Agent, or Firm*—Browdy and Neimark

[57] ABSTRACT

A method of removing unwanted inclusion particles from a body of liquid aluminium or aluminium alloy by deposition thereof comprising 1.
  (a) adding to the liquid metal at least one alloying constituent in greater quantity than is eventually required and
  (b) raising the metal temperature higher than the desired casting temperature and above that liquidus of the alloy below which some intermetallic particles can form,
2. causing the temperature of the liquid metal to fall below the said liquidus so that intermetallic phase particles nucleate and cause the residual liquid metal to alter its composition and temperature according to the liquidus line of the phase diagram until it achieves a desired temperature and composition, characterized in that:
the alloying constituent is chosen as to form a peritectic system with aluminium and the intermetallic is chosen to nucleate preferentially on or in the vicinity of certain inclusion particles and grow to form complex bodies which have an enhanced settling rate and which grow to a size and with a morphology such that during settling the liquid metal is scavenged of other smaller particles.

19 Claims, 3 Drawing Sheets

ALUMINIUM ALLOY TREATMENT

FIELD OF THE INVENTION

This invention relates to the treatment of liquid aluminium alloys.

DESCRIPTION OF THE PRIOR ART

Aluminium alloy melts are often left to settle prior to casting in order that unwanted inclusion particles may be deposited as a sediment. Such particles are commonly oxides ($Al_2O_3$), borides ($TiB_2$) and spinels ($MgAl_2O_4$) which may be detrimental to the properties of a cast product and may influence grain size control during the casting of certain alloys.

Very fine particles, in the size range 1–40 $\mu$m will not have time, in the time scale appropriate to production conditions, to settle and even if they did, re-entrainment would be likely. It has therefore been commonplace to filter the metal before casting.

It is an object of the present invention to provide an improved method of treating aluminium alloys in their liquid state to induce deposition of unwanted inclusion particles, and to influence the response of the alloy to subsequent grain refinement procedures.

SUMMARY OF THE INVENTION

According to one aspect of the present invention there is provided a method of removing unwanted inclusion particles from a body of a liquid aluminium alloy by deposition thereof comprising 1.
   (a) adding to the liquid metal at least one alloying constituent in greater quantity than is eventually required
   (b) raising the metal temperature higher than the desired casting temperature and above that liquidus of the alloy below which some intermetallic particles can form,
2. causing the temperature of the liquid metal to fall below the said liquidus so that intermetallic phase particles nucleate and cause the residual liquid metal to alter its composition and temperature according to the liquidus line of the phase diagram until it achieves a desired temperature and composition, characterised in that the alloying constituent is chosen so as to form a peritectic system with aluminium and the intermetallic is chosen to nucleate preferentially on or in the vicinity of certain inclusion particles and grow to form complex bodies which have an enhanced settling rate and which grow to a size and with a morphology such that during settling the liquid metal is scavenged of other smaller inclusion particles.

DESCRIPTION OF THE DRAWINGS

The above and other aspects of the present invention will now be described with reference to the accompanying drawings in which.

Figure 1:
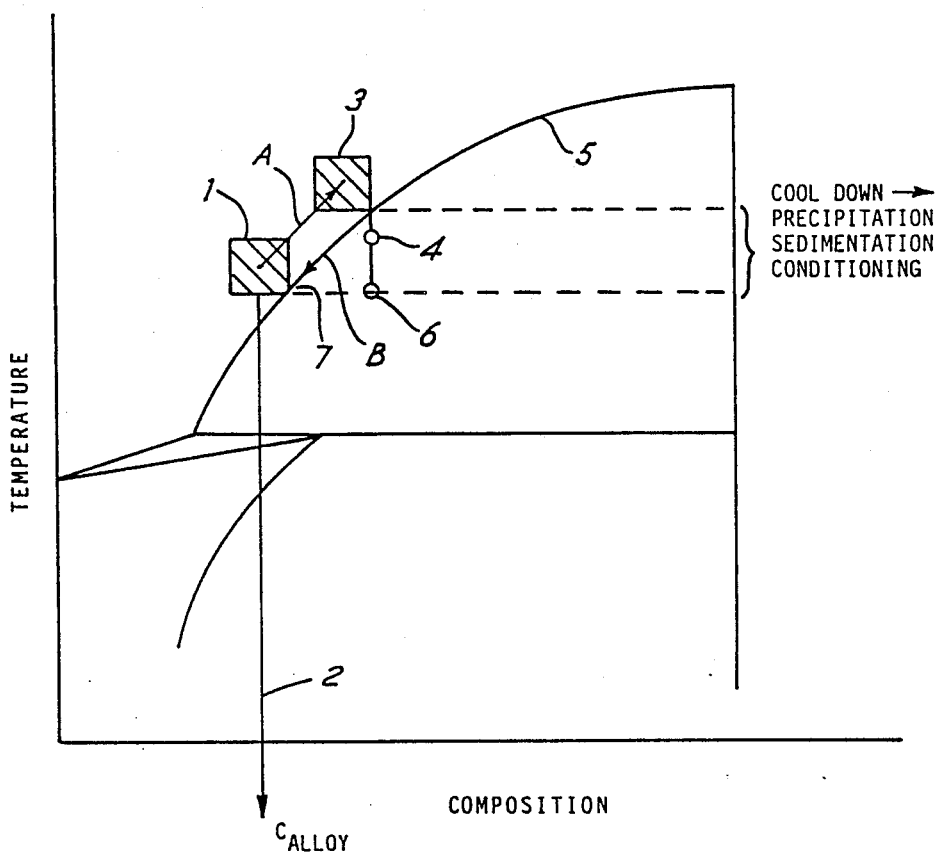
FIG. 1 is a simplified phase diagram of the binary system showing both a composition and a thermal path and FIGS. 2 and 3 are graphs.

The process of the present invention is particularly applicable to aluminium alloys and involves the nucleation of large heavy particles, directly from the melt, on and in the vicinity of small inclusions which then settle very rapidly because of their effective increase in size. Furthermore, the shape of the nucleated phase, and in special cases, its chemical affinity for certain inclusions present in the liquid metal such as $TiB_2$, result in a high "scavenging" action of the phase as it falls through the liquid metal. Because of the very positive nature of this agglomeration action, clustered inclusions are not easily re-entrained after settling. Once the nucleating phase has grown and begun to settle, metallography has shown that it gathers inclusion particles into large clusters which then sediment extremely quickly. For cases where the nucleating phase has a chemical affinity for the inclusion to be removed, the scrubbing action is almost completely effective, in a very short time period.

Several families of chemical and physico-chemical reactions can be of significance in influencing the separation behaviour of solid inclusions from a fluid. For example, it is well known that certain oxide inclusions may be effectively removed from liquid aluminium and its alloys by flux washing processes involving the treatment of the metal or alloy with liquid or gaseous fluorides of for example Li, Ma, K, Mg, Al, or Ce; chlorides of K, Ma, Mg, or combinations of these. Because these salts are essentially non-reactive and immiscible with the liquid metal, they tend to form dispersed droplets of liquid flux under normal processing conditions and must be actively mixed with liquid metal in order to effectively gather oxide inclusions from the melt. Because of their chemical reactivity with oxides but their essential non-reactivity with titanium diboride and because of their small surface area to volume ratio (spheres) they are to a greater or lesser extent selective in their cleaning action, and do not provide an efficient fluxing agent for borides, other than via direct physical aggregation. Furthermore liquid flux residues are particularly difficult to remove from molten metal once they are finely dispersed.

$TiB_2$ has a very large negative free energy of formation, $\Delta Gf^\circ$, boron is essentially insoluble in aluminium, and compounds of titanium other than borides, carbides and nitrides generally have less negative $\Delta Gf^\circ$ values than those for Al, Mg, Zr and the other major solute additives to aluminium alloys. This makes the compound particularly difficult to separate from the metal by anything other than direct filtration.

Extensive analysis of the thermodynamic phase equilibria between titanium diboride, aluminium alloys and a wide range of chemical compounds embracing, fluorides, chlorides, oxides, oxychlorides, hydrides, carbides, nitrides, sulphides, bromides, iodides, silicides, and aluminides has shown that zirconium and hafnium alone will displace the titanium from $TiB_2$ to form $ZrB_2$ or $HfB_2$ and in particular the reaction

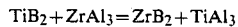
$$TiB_2 + ZrAl_3 = ZrB_2 + TiAl_3$$

is thermodynamically favourable at normal casting temperatures; the reaction having small but positive equilibrium rate constants given by Log10 $K^\circ R = 0.333$ @ 1000° K.

and

Log10 $K^\circ R = 0.221$ @ 1200° K.

We have found that when certain intermetallic phases nucleate, and in particular phases which separate peritectically in molten aluminium alloys such as e.g. $ZrAl_3$, $TiAl_3$, $MoAl_{12}$, $VAl_{10}$, $HfAl_3$, $NbAl_3$, $WAl_4$ and $CrAl_7$ they do so on or in the vicinity of oxide inclusions dispersed in the metal. These then sediment rapidly due to their high specific gravity with respect to the liquid metal.

We have also found that certain intermetallic phases such as $ZrAl_3$, $TiAl_3$ and complexes of $(TiZr)Al_3$ tend to form large needlelike clusters under cooling conditions readily attainable in aluminium holding furnaces or during the transfer of molten metal from furnace to other in-line metal treatment plant (i.e. in the range 0.5° C./min–10° C./min). These clusters then sediment rapidly, continuing to grow as they do so.

We have further shown that it is possible to control the nucleation density and morphology of said intermetallic clusters by deliberately controlling the composition, local cooling rate and temperatures, and thereby influence the sedimentation behaviour of the system.

We have also found that when $ZrAl_3$ crystals formed in the melt come into close contact with $TiB_2$ particles dispersed in the melt, they react chemically with them to form intimately bonded and well agglomerated complexes of Zr and Ti aluminides and borides.

The alloy to be cleaned must have a melt composition such that as the melt temperature is allowed to fall from an initial holding temperature to a lower casting temperature, a primary phase boundary is crossed and intermetallics nucleate and begin to grow. In some alloy systems such as Aluminum Association 7XXX alloys containing Zr, or the superplastic Al-Cu-Zr alloys, this could result in too low a casting temperature and an ingot at the lower end of its acceptable specification range. This is because as the intermetallic grows it depletes the melt of solute. To overcome this problem deliberate additions of a single solute or solutes in combination must have been made to the molten alloy at an appropriate temperature prior to the cooling and sedimentation cycle.

Referring to FIG. 1, in the D.C. casting of a simple binary Al-Zr alloy or other commercial aluminium alloy containing up to 0.25 wt % Zr such as (Aluminum Association 7010 or 7150) the normal temperature/composition casting window is represented by the shaded box 1. Alloys in this window can be conventionally cast as represented by the arrow 2 (perhaps after settling and filtering) without the occurrence of coarse primary $ZrAl_3$ intermetallic in the product. If, however, the initial temperature and composition of the alloy are adjusted along the arrow A to the box 3, and then the alloy is cooled to a point such as 4 below the liquidus line 5, $ZrAl_3$ crystals will nucleate and grow. If this procedure is carried out slowly the average composition of the melt will change according to the liquidus 5 along the arrow B. Further cooling to 6 in the figure will result in the average liquid composition tending towards the point 7.

It will be understood that the present invention is applicable to any system in which the alloy composition to be cast lies in close proximity to a peritectic point in the relevant phase diagram. This means that if the deliberate solute addition were to act completely independently of all other solutes already present in the alloy then this would severely limit the type of alloy system which could be treated in this way. This is because the material would necessarily contain approximately the peritectic composition level of added solute, after cleaning as a result of the residual liquid tracking down along its liquidus line towards the monovariant point. This however is not necessarily a limitation and, for example, in the presence of a low level of excess titanium, such as would be found in most alloys after the addition of commercial grain refiners, the amount of, for example, zirconium which would need to be added to promote the nucleation of coarse intermetallics is very low (0.1%) and after cleaning and the melt conditioning inherent in the present invention will fall to below 0.05%, which is inside the allowable level in most commercial alloy specifications. This means that to intrinsically clean the more dilute alloys then both the Zr and Ti levels, for example, may need to be adjusted.

The intermetallic phase formed in the ternary Al-Zr-Ti system is a substituted $Zr(Ti)Al_3/Ti(Zr)Al_3$ rather than a true ternary compound, and the nucleating phase is essentially either $ZrAl_3$ or $TiAl_3$ (depending on overall alloy composition) which then grows, depleting the liquid of both Zr and Ti as it does so. So long as all growth centres are removed from the system (by settling them out) there is a reduced tendency of renucleating new $ZrAl_3$ or $TiAl_3$ particles, after the initial sedimentation sequence. Therefore, as the temperature continues to fall, for example as the metal is cast, no further intermetallic nucleation events occur. Moreover, since the melt conditioning process removes other heterogeneous nuclei from the liquid metal, nucleation of other solid phases such as primary dendrites is also easier to control.

This means that it is not necessary to introduce a reheating step into the thermal sequence prior to casting the metal and that if the process is carried out in a batching or furnace settling mode it is sufficient to allow the furnace to equilibrate at the casting temperature prior to pouring. However, such a reheating step could, if necessary, be included. Alternatively the process may be carried out in-line by pouring the metal from an initial holding temperature into a launder along which both temperature and particle/inclusion clusters fall and then filtering the liquid metal.

EXAMPLES

A. Enhanced sedimentation in Al-Zr Binary systems

Charges of various weights have been prepared and either cast in the usual way or conditioned and cast according to the present invention.

Alloys containing 0.1 wt % Zr were melted in either 20 kg or 1000 kg batches, degassed with argon using a conventional gas lance and grain refiner added in the form of Al-5%Ti-1%B waffle plates. The charge was then raised to an initial holding temperature of 760° C. for 30 mins and allowed to fall to 700° C. The charge was then stirred and held for prescribed settling periods of 0, 20 or 30 mins after which samples were taken for cleanliness assessment. Three sets of identical experiments were conducted.

Figure 2:
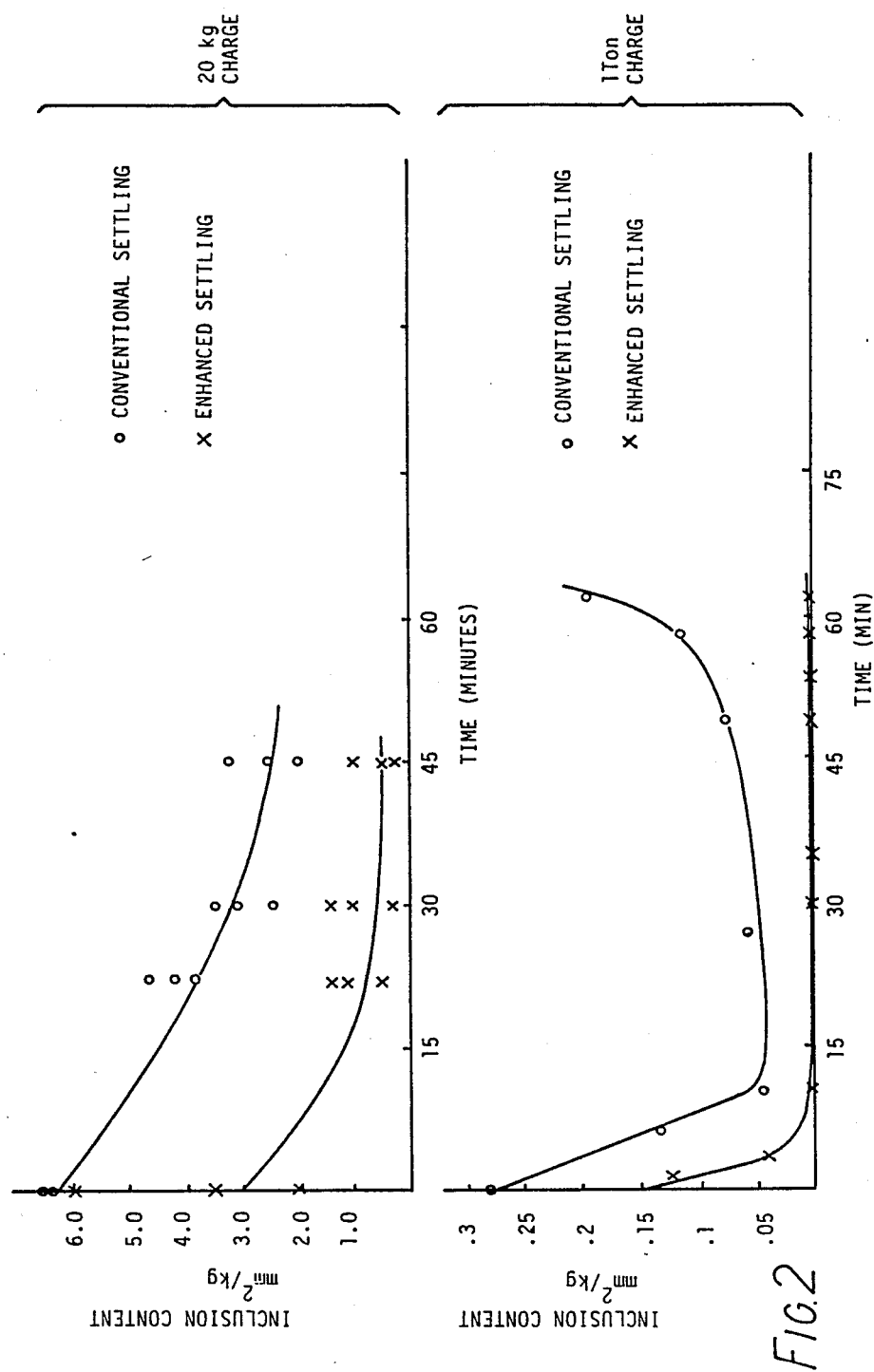

The above procedure was reproduced for alloys containing 0.2–0.25% Zr with the charges held for 30 mins at 760° C. to ensure complete dissolution of the excess Zr prior to the conditioning sequence. Samples for metal cleanliness assessment were then taken. The results are shown in FIG. 2 in which the units used are a measure of metal cleanliness expressed as area of inclusion per kilogram of liquid metal obtained in a standardised pressure filtration test. These results show that material produced according to the present invention settles at an accelerated rate and that the resultant metal has a lower inclusion content.

EXAMPLE B

Enhanced sedimentation in the Al-Mg-Mn system (AA 3004) using a combined Ti +Zr solute addition.

20 kg charges of AA 3004 were prepared in a similar manner as for Example A, but in this case, a combined addition of 0.1 wt % Zr and 0.1 wt % Ti was made prior to the conditioning cycle. The melt was cooled to 700° C. and allowed to settle for 2 hours with samples taken for both metal cleanliness and composition assessment every 15 minutes.

The results are given in Table 1. It is clear that the resultant metal is both clean and within the allowable composition specification for the alloy.

rect chill casting. In particular it allows the use of boron free grain refiners such as Al-Ti. It is also the case that the inherent (self) grain refinement of the alloy is more uniform and reproducible. This has significant advantages for products such as lithium containing aluminium base alloys where a specified grain size is required at the cast stage, or for products such as lithographic sheet, bright trim, magnetic disc material, or photocopier tube where boride free but uniform grain size is of paramount importance.

EXAMPLE C

Grain sizes have been measured, metallographically on a number of commercial aluminium-lithium alloys,

TABLE 1

| | AA 3004 + Zr AND Ti | | | | |
|---|---|---|---|---|---|
| | MELT Zr CONCENTRATION | | INGOT Zr CONCENTRATION | | INCLUSION REMOVAL |
| | BEFORE CONDITIONING | AFTER CONDITIONING | TOP | BOTTOM | % |
| NORMAL SEDIMENTATION | 0.11 | 0.11 | 0.11 | 0.11 | 65-85 |
| ENHANCED SEDIMENTATION SINGLE SOLUTE (Zr) ADDITION | a. 0.28 | 0.19 | 0.18 | 0.19 | 100 |
| | b. 0.18 | 0.12 | 0.12 | 0.11 | 94 |
| COUPLED SOLUTE (Ti + Zr) ADDITION | 0.10 | 0.06 | 0.05 | 0.05 | 90-95 |

In the grain refinement of Zr containing aluminium alloys the response of the system to a given grain refiner or grain refining practice is somewhat non-uniform and non-reproducible from melt to melt. This may result in serious problems with castability e.g. cracking, and mechanical properties, particularly fracture toughness—which is very dependent on uniformity of structure. Al-Li alloys containing Zr are particularly prone to this problem. This interaction of Zr with a grain refiner such as Al-Ti-B is well known and is termed grain refiner poisoning which may result in a level of inclusion particles ($TiB_2$) which are both detrimental to common filtration practices and in certain cases, mechanical properties of the final product.

Whilst the precise mechanistic details of poisoning are not fully understood it is believed to be related to (1) The presence of incipient $ZrAl_3$ nuclei which are prone to form directly from the melt at or above the casting temperature, (2) the chemical interaction between Zr and other grain refiner species, e.g. $ZrAl_3 + TiB_2 \rightarrow TiAl_3 + ZrB_2$ at casting temperatures and (3) the presence of complex oxide and other heterogeneous nuclei—aggravated by the presence of Zr. The net effect of these is the uncontrolled presence of heterogeneous nuclei of different nucleation potency (temperature at which they act close to the solid-liquid front) in the solidifying sump of the D.C. ingot. Although filtration can influence or reduce the problem associated with these nuclei (by removing them), it cannot guarantee their total exclusion—particularly those small species which are most likely to cause grain nucleation.

The present invention overcomes these difficulties by deliberately precipitating and removing those species which would otherwise form in an uncontrolled fashion under normal circumstances. After the melt conditioning step the melt is in a condition which is then reproducible from day to day and is ripe for controlled grain refinement using conventional techniques prior to direct chill casting.

including AA 8090 and AA 8091. The materials have either been direct chill cast as 1 tonne ingots or as standard grain refinement test samples using the well known Alcan Contact Time Test. Materials have been evaluated in the following conditions:

1. Ungrain refined, conventionally processed
2. Grain refined, conventionally processed
3. Conditioned according to present invention, ungrain refined
4. Conditioned and grain refined.

In all cases grain refiner was added in the form of commercially available Al-Ti-B master alloys.

Figure 3:
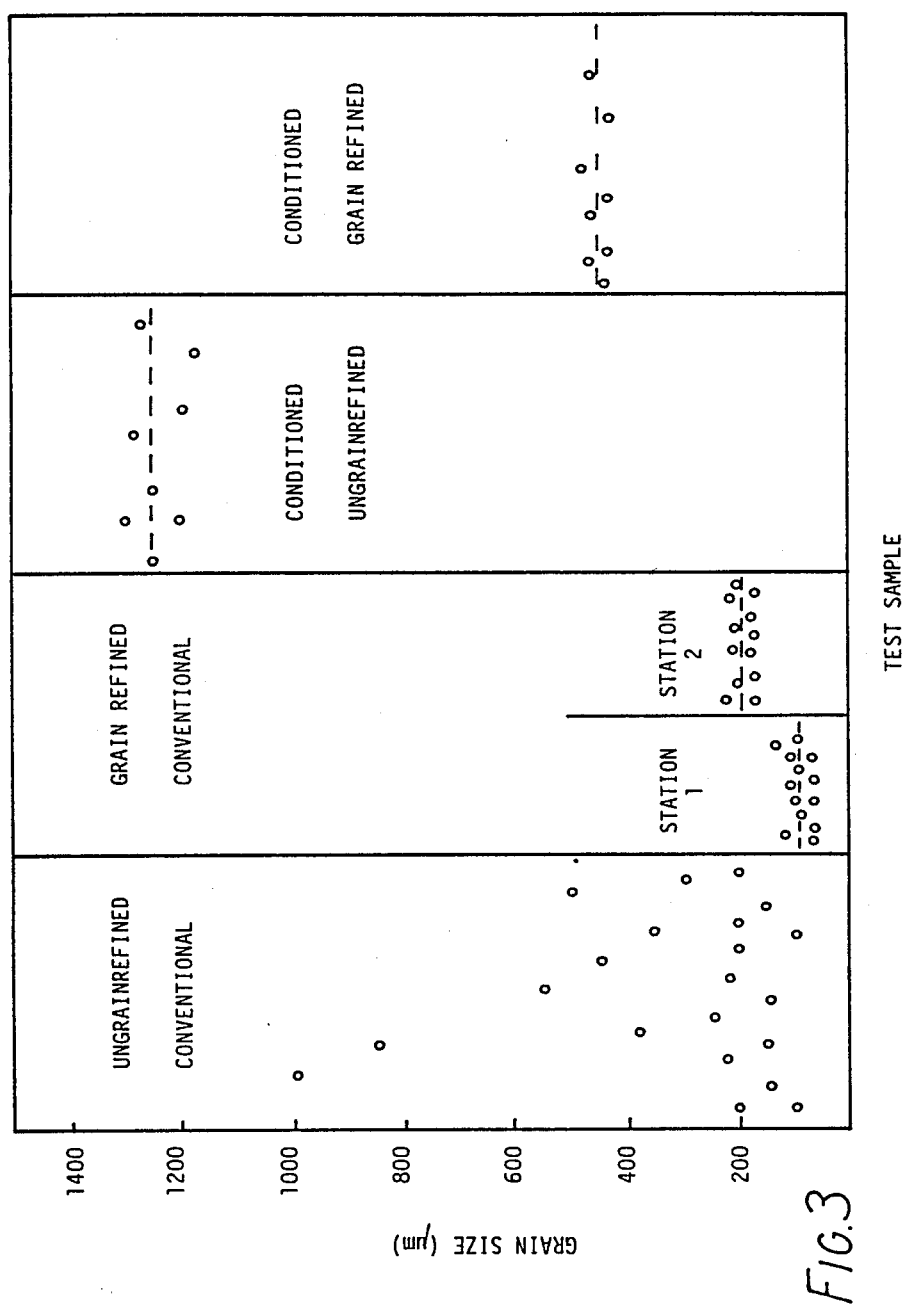

The results are summarised in FIG. 3. The figure shows the very variable grain size obtained in conventionally processed, ungrain refined material, and the relatively fine (<200 μm) grain obtained after normal grain refiner additions. The figure also shows a distinct difference in grain sizes obtained from two different casting stations with the Alcan group.

As shown, the average grain size may be 200 to 1200 μm, and is preferably in the range of 300 to 1000 μm.

After melt conditioning the grain size of material increases to >1200 μm, after which a selected and controllable grain size can be obtained with the addition of grain refiner. Attempts to achieve similar control in conventionally processed material result in variable grain sizes from melt to melt.

Thus the present invention has the following features:

1. There is no need to add fluxes, gases or other contaminants.
2. The nucleating phase automatically locates and homes on to the small inclusion particles—there is no need to stir or mix the system.
3. There are no moving parts.
4. Once "tagged" an oxide particle/intermetallic cluster scavenges the melt of inclusions in the case of liquid aluminium alloys, very quickly.

5. The process is applicable to a wide range of alloys by controlling composition alone.

Other features of the invention are:

1. By controlling the rate of cooling through the sedimentation stage the size and number of the intermetallic can be controlled which in tun affects the rate of settling and the degree of scavenging. This enables the design of sedimentation systems to optimise rates and scrubbing efficiency required for a particular operation.
2. The sedimenting particles may be allowed to collect against a glass cloth or rigid media filter such as a ceramic foam or sintered grit filter promoting a cake filtration mode rather than a depth mode of inclusion retention the former being known to result in a greater resistance of the system to inclusion release events such as can occur in the event of local transient metal flow.

What I claim is:

1. A method of removing unwanted inclusion particles from a body of liquid aluminum or aluminum alloy by deposition thereof comprising
   A. 1. adding to the liquid metal an excess of at least one alloying constituent and
   2. raising to metal temperature higher than a selected casting temperature and above that liquidus of the alloy below which some intermetallic particles can form,
   B. causing the temperature of the liquid metal to fall below the said liquidus so that intermetallic phase particles nucleate and cause the residual liquid metal to alter its composition and temperature according to the liquidus line of the phase diagram until it achieves a selected temperature and composition,
   wherein
   the alloying constituent is chosen so as to form a peritectic system with aluminum and the intermetallic is chosen to nucleate preferentially on or in the vicinity of inclusion particles of oxide, boride, spinel or mixtures thereof and grow to form complex bodies which have an enhanced settling rate and which grow to a size and with a morphology whereby during setting the liquid metal is scavenged of titanium diboride particles.

2. A method according to claim 1 in which the intermetallic has a density relative to the liquid metal greater than 1.5.

3. A method according to claim 1 claim 2 in which the intermetallic is chosen to have a chemical reaction with said inclusion particles so as to bond therewith.

4. A method according to claim 1 in which said preclusion particles include oxides and the intermetallics are chosen from:
   $ZrAl_3$, $HfAl_3$, $TiAl_3$, $NbAl_3$, $MoAl_{12}$, $VAl_{10}$, $WAl_4$ and $CrAl_7$.

5. A method according to claim 4 in which the size and morphology of the complex bodies are determined by controlling the local cooling rate of the liquid metal.

6. A method according to claim 2 in which the intermetallic is chosen to have a chemical reaction with said inclusion particles so as to bond therewith.

7. A method according to claim 2 in which said inclusion particles include oxides, and the intermetallics are chosen from:
   $ZrAl_3$, $HfAl_3$, $TiAl_3$, $NbAl_3$, $MoAl_{12}$, $VAl_{10}$, $WAl_4$, and $CrAl_7$.

8. A method according to claim 2 in which the size and morphology of the complex bodies are determined by controlling the local cooling rate of the liquid metal.

9. A method according to claim 2 further comprising, after removing said particles, grain refining and casting the liquid metal as a direct chill ingot to produce a predetermined average grain size in the range 300 μm to 1000 μm.

10. A method according to claim 3 in which said inclusion particles include oxides, and the intermetallics are chosen from:
    $ZrAl_3$, $HfAl_3$, $TiAl_3$, $NbAl_3$, $MoAl_{12}$, $VAl_{10}$, $WAl_4$ and $CrAl_7$.

11. A method according to claim 2 in which said inclusion particles include $TiB_2$ *pl and the intermetallics are chosen from*:
    $ZrAl_3$, $HfAl_3$, $TiAl_3$ and complexes thereof.

12. A method according to claim 3 in which the size and morphology of the complex bodies are determined by controlling the local cooling rate of the liquid metal.

13. A method according to claim 3 further comprising, after removing said particles, grain refining and casting the liquid metal as a direct chill ingot to produce a predetermined average grain size in the range 300 μm to 1000 μm.

14. A method according to claim 1 in which said inclusion particles include $TiB_2$ and the intermetallics are chosen from:
    $ZrAl_3$, $HfAl_3$, $TiAl_3$ and complexes thereof.

15. A method according to claim 1 in which the size and morphology of the complex bodies are determined by controlling the local cooling rate of the liquid metal.

16. A method according to claim 6 further comprising, after removing said particles, grain refining and casting the liquid metal as a direct chill ingot to produce a predetermined average grain size in the range 300 μm to 1000 μm.

17. A method according to claim 16 using a grain refiner which is free of boron.

18. A method according to claim 1 further comprising, after removing said particles, grain refining and casting the liquid metal as a direct chill ingot to produce a predetermined average grain size in the range 300 μm to 1000 μm.

19. A method according to claim 11 using a grain refiner which is free of boron.

* * * * *